Oct. 9, 1962 J. B. CLARK 3,057,967
MAGNETIC TRANSDUCER
Filed May 21, 1958

INVENTOR.
JOHN B. CLARK
BY
ATTORNEY

United States Patent Office 3,057,967

Patented Oct. 9, 1962

3,057,967

MAGNETIC TRANSDUCER

John B. Clark, Santa Clara County, Calif., assignor to International Business Machines Corporation, New York, N.Y., a corporation of New York Filed May 21, 1958, Ser. No. 736,785
6 Claims. (Cl. 179—100.2)

This application relates in general to magnetic transducers and relates more particularly to a "wide-write, narrow-read" magnetic transducer.

In the field of magnetic data storage devices wherein a magnetic transducer is positionable for cooperating with selected tracks of a magnetic record member, there is considerable need of means for accurately repositioning the transducer to a location where data had been previously recorded. Unless the transducer is repositioned to the same location (within a given tolerance) transversely of the track as it was when the data was recorded, errors in the detection of the coded data may result. To prevent such errors, transducers have been provided for writing along a wider strip of track than is scanned by the transducer for reading purposes. This permits a greater tolerance in the accuracy of the transducer positioning mechanism, while still insuring accurate reproduction of the recorded information. One such transducer which is adapted to longitudinal magnetic recording is shown in the copending application Serial No. 532,488, filed September 6, 1955, now abandoned, in the name of Wesley A. Holman and assigned to the same assignee as the present application, wherein the write gap provided in the core of the transducer is wider than the corresponding read gap.

An alternative solution to this problem, applicable to probe type transducers, is disclosed in copending application Serial No. 690,020, filed October 14, 1957, now Patent No. 2,963,690 in the name of Wesley A. Holman and assigned to the same assignee as the present application. In this application the transducer is provided with a read portion which is disposed closer to the magnetic recording surface than the rest of the transducer. In reading, only the relatively narrow read portion of the transducer, which is disposed symmetrically of the overall transducer, is effective in reading from the magnetic surface. In writing, a high flux density is used so that the difference in the reluctance of the paths between the read portion of the transducer and the rest of the transducer has substantially no effect, and the overall transducer is effective in writing. A further solution to the problem is disclosed in copending application Serial No. 683,151, filed September 10, 1957, now Patent No. 2,961,645, in the name of Wesley E. Dickinson and assigned to the same assignee as the present application. In this application the transducer is provided with an auxiliary winding which is magnetically linked to a portion of the transducer face. During reading this winding is short-circuited to increase the reluctance of the portion of the transducer with which the winding is linked, thus effectively diverting flux to the unlinked or reading portion of the transducer. During writing, this winding is open-circuited so that it has substantially no effect on the operation of the overall transducer.

Broadly, the present invention contemplates a wide-write, narrow-read transducer adapted for vertical magnetic recording and comprising a plurality of magnetic members or cores spaced from each other in a direction transverse to the direction of relative movement between the transducer and the record track. The transducer is provided with a reading winding which links only selected ones of the magnetic members, and is also provided with a writing winding which is magnetically associated with all of the magnetic members.

In one form of the invention the transducer includes three magnetic leg members spaced from each other in a direction transverse to the direction of relative movement between the transducer and the record track. In this embodiment a reading winding is magnetically associated with one of the magnetic members, preferably the member which is symmetrically disposed with respect to the other two members. A writing winding is magnetically associated with all three magnetic members. Thus, upon reading, only the center or reading member is effective, since this is the only member to which the reading winding is magnetically linked. For writing, the writing winding is energized and since this winding is magnetically associated with all three magnetic members of the transducer, the effective width of the writing pattern is wider than that for the reading pattern.

In an alternative form of the invention, the transducer comprises a hollow tubular magnetic member inside which is disposed a magnetic reading member. The magnetic reading member has associated therewith a reading winding, and a writing winding is magnetically associated with both the outer tubular member and the inner reading member. Thus, on writing, the width of the writing pattern is determined by the width of the outer tubular member. However, for reading, the width of the reading pattern is determined by the width of only the inner reading member, since the reading winding is magnetically associated only with the reading member, thus producing a narrower reading pattern.

It is therefore an object of the present invention to provide an improved wide-write, narrow-read magnetic transducer.

It is a further object of the present invention to provide a wide-write, narrow-read probe type magnetic transducer.

It is a further object of the present invention to provide a wide-write, narrow-read magnetic transducer having a writing winding which is magnetically associated with the entire transducer and having a reading winding which is magnetically associated with only a portion of the transducer.

It is an additional object to provide a wide-write, narrow-read transducer having a writing winding which is magnetically associated with the entire transducer and having a reading winding which is magnetically associated only with a portion of the transducer, this latter portion being symmetrically disposed with respect to the portion associated with the writing winding.

Other objects of the invention will be pointed out in the following description and claims and illustrated in the accompanying drawings, which disclose, by way of example, the principle of the invention and the best mode which has been contemplated of applying that principle.

Figure 1:
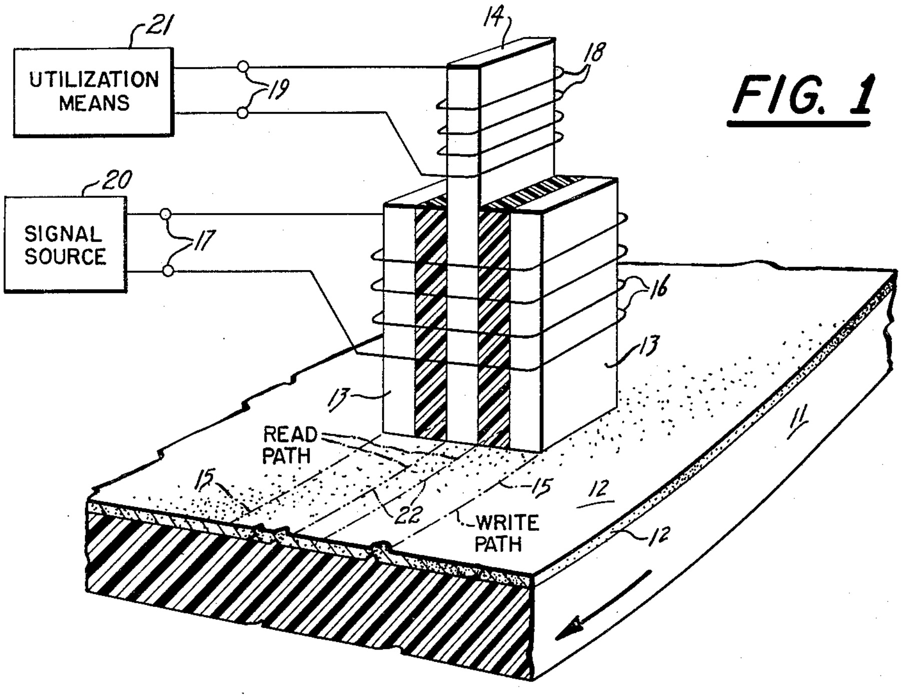
FIG. 1 is a perspective view of one embodiment of the present invention in which the transducer comprises three magnetic members, with the reading member being symmetrically disposed between the other two members.

Referring to FIG. 1, by character of reference, numeral 11 designates the magnetic recording medium on which the data is to be recorded and from which it is to be reproduced. Recording medium 11 may be of any suitable type such as a disc having a coating 12 of magnetic material on which bits of information are recorded and reproduced. The direction of relative movement between the magnetic recording medium 11 and the transducer assembly is shown by the arrows. In the embodiment illustrated in FIG. 1, the transducer includes three magnetic members spaced from each other in a direction transverse to the direction of relative movement between the recording medium and the transducer. Two of the leg members 13 may be substantially identical and are spaced from each other in a direction transverse to the direction of movement. The third magnetic member 14 is disposed between leg members 13, and is preferably symmetrically disposed therebetween. Member 14 also preferably extends above the ends of member 13, as shown in the drawing. Members 13 and 14 are magnetically insulated from each other by air or by some other suitable material of relatively high reluctance.

The transducer is provided with a writing winding 16 which is disposed around the leg members 13 and 14 so as to be magnetically associated with all three members. Writing winding 16 is provided with terminals 17 to which the signal to be recorded is supplied from any suitable signal source 20, as is well known in the art. The transducer is also provided with a reading winding 18 which is disposed about the upper end of reading member 14 so as to be magnetically associated only with member 14. Reading winding 18 is provided with terminals 19 from which the signal detected may be supplied to suitable utilization means or apparatus 21.

In operation, to record information on medium 11 the signal representing the information to be recorded is supplied to winding 16 through terminals 17. Since winding 16 is magnetically linked or associated with all three members 13 and 14, the flux pattern produced as a result of the current flow in winding 16 has an effective width equal to the width of the transducer assembly. Thus, the writing pattern 15 produced on recording medium 11 has a width corresponding to the width of the transducer assembly. To read the information recorded on medium 11, winding 16 is disconnected from the signal source 20 and winding 18 is connected to utilization apparatus 21 through terminals 19. Since reading winding 18 is magnetically associated only with member 14, the effective width of the transducer for reading is the width of member 14 in a direction transverse to the direction of relative movement between the transducer and the recording medium. Thus, only the portion of recording medium 11 corresponding to the width of member 14 is scanned on the reading operation to produce a reading pattern 22 considerably narrower than, but symmetrically disposed with respect to, the writing pattern 15.

Figure 2:
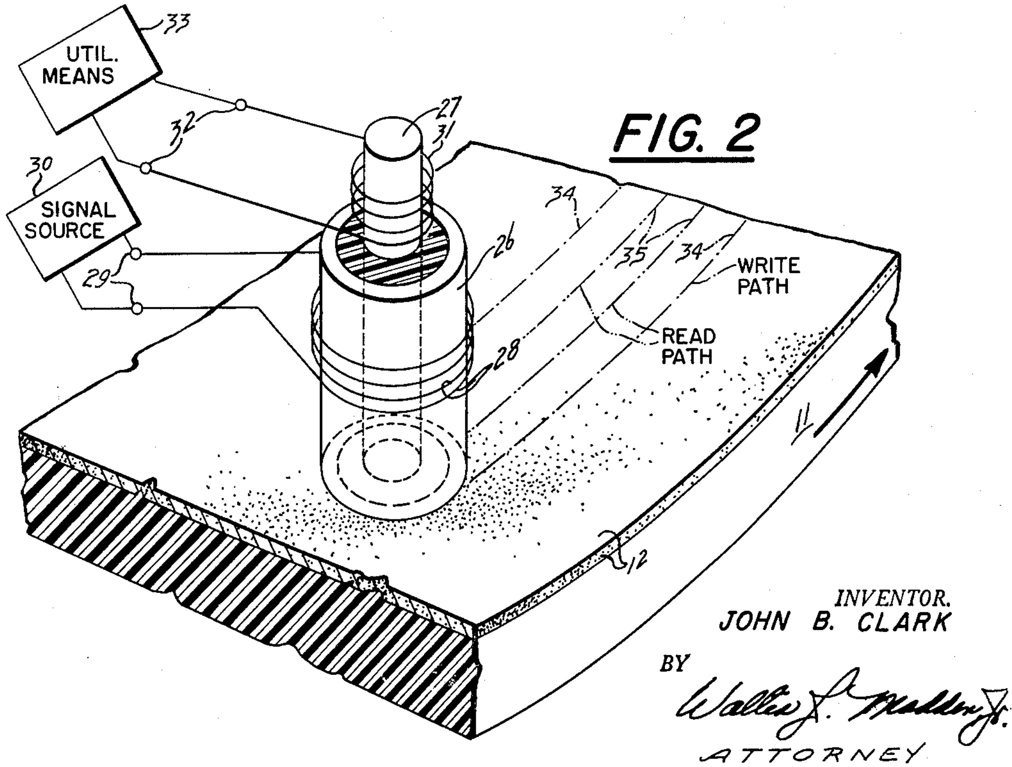
FIG. 2 is a perspective view of an alternate embodiment of the present invention in which the transducer is in the form of an outer hollow tubular member having a magnetic reading member disposed inside thereof.

FIG. 2 illustrates an alternative embodiment of the invention using a tubular magnetic outer member 26 inside which is disposed a reading member 27 of a suitable magnetic material. Member 27 is preferably disposed symmetrically of outer member 26, and both members 26 and 27 are disposed so that their faces lie on or a short distance from the surface of recording medium 11. A writing winding 28 is disposed around the outside of member 26 so as to be magnetically associated with both member 26 and inner member 27. Writing winding 28 is provided with terminals 29 connected to a suitable source 30 for supplying the signal to be recorded on medium 11. Reading member 27 extends above outer member 26 and this extending portion of member 27 has disposed therearound a reading winding 31 which is magnetically associated only with reading member 27. Winding 31 is provided with terminals 32 for supplying the signal produced in winding 31 to suitable utilization apparatus or means 33.

In operation, for writing the signal representing the information to be recorded is supplied to writing winding 28 through terminals 29. The current flow in writing winding 28 in response to this signal produces a flux pattern having an effective width equal to the width or diameter of member 26, so that the effective writing pattern 34 is the width or outer diameter of member 26. To read the information written on recording medium 11, writing winding 28 is disconnected and reading winding 31 is connected through terminals 32 to the utilization apparatus 33. Since winding 31 is magnetically associated only with reading member 27, the reading pattern 35 has a width substantially equal to the diameter of inner member 27. It will be seen that this reading width is considerably narrower than the width of the writing pattern, so that the reading operation produces an effective scan of only the center portion of the writing pattern.

Thus, it will be seen that I have provided a magnetic transducer adapted to write on a magnetic surface in a relatively wide pattern, and to read the writing from this surface in a relatively narrow pattern. In connection with the embodiments of both FIG. 1 and FIG. 2, it will be seen that mechanical wear of the transducer during use will have substantially no effect on the operation of the transducer, since any such wear will occur uniformly over the face of the transducer and hence will not change the symmetry of the elements.

Although only two embodiments of the present invention have been illustrated and described, it will be apparent to those skilled in the art that various modifications and changes may be made therein without departing from the spirit of the invention. In particular, it will be apparent that the configurations and shapes of the elements comprising the transducers illustrated in FIGS. 1 and 2 are by no means meant to be an indication of the optimum or even actual shapes of these elements. It is the intention, therefore, to be limited only as indicated by the scope of the following claims.

What is claimed is:

1. A magnetic transducer for cooperating with a relatively moving magnetic record track comprising a plurality of discrete magnetic members spaced from each other laterally with respect to the direction of relative movement between said transducer and said record track, each of said magnetic members being separated from the other members by a non-magnetic material and being disposed substantially the same distance from said record track in flux-exchanging relation therewith, a reading winding magnetically associated with at least one of said magnetic members, utilization means coupled to said reading winding, a source of signals to be written along said track, and a writing winding coupled to said source and magnetically associated with all of said magnetic members.

2. A magnetic transducer for cooperating with a relatively moving magnetic record track comprising a plurality of discrete magnetic members spaced from each other laterally with respect to the direction of relative movement between said transducer and said record track, each of said magnetic members being separated from the other members by a non-magnetic material and being disposed substantially the same distance from said record track in flux-exchanging relation therewith, a reading winding magnetically associated with less than all of said magnetic members, said magnetic members with which said reading winding is associated being symmetrically disposed with respect to the rest of said members, utilization means coupled to said reading winding, a source of signals to be written along said tracks, and a writing winding coupled to said source and magnetically associated with all of said magnetic members.

3. A magnetic transducer for cooperating with a relatively moving magnetic record track comprising three discrete magnetic members spaced from each other laterally with respect to the direction of relative movement between said transducer and said record track, each of said magnetic members being separated from the other members by a non-magnetic material and being disposed substantially the same distance from said record track in flux-exchanging relation therewith, a reading winding magnetically associated with the center one of said magnetic members, and a writing winding magnetically associated with all of said magnetic members and constructed and arranged with respect thereto to record applied signals via said members along said track.

4. A magnetic transducer for cooperating with a relatively moving magnetic record track comprising a pair of concentrically disposed discrete magnetic members, each of said magnetic members being separated from the other members by a non-magnetic material and being disposed substantially the same distance from said record track in flux-exchanging relation therewith, a reading winding magnetically associated with the inner one of said magnetic members, and writing winding magnetically associated with both of said magnetic members.

5. A magnetic transducer for cooperating with a relatively moving magnetic record track comprising a tubular magnetic member, a magnetic reading member disposed inside said tubular member and magnetically spaced therefrom, a reading winding magnetically associated with said reading member, each of said magnetic members being disposed substantially the same distance from said record track in flux-exchanging relation therewith, and a writing winding magnetically associated with both said tubular member and said reading member.

6. A magnetic transducer for cooperating with a relatively moving magnetic record track comprising a pair of discrete magnetic members spaced from each other laterally with respect to the direction of relative movement between said transducer and said record track, a third magnetic member disposed between said pair of magnetic members, each of said magnetic members being disposed substantially the same distance from said record track in flux-exchanging relation therewith, a reading winding magnetically associated with said third member, and a writing winding magnetically associated with said third member and said pair of members, said writing winding being further constructed and arranged with respect to said third member and pair of members as to record along said track electrical signals applied to said writing winding.

References Cited in the file of this patent

UNITED STATES PATENTS

| | | |
|---|---|---|
| 2,676,392 | Buhrendorf | Apr. 27, 1954 |
| 2,682,578 | Claras | June 29, 1954 |
| 2,704,789 | Kornei | Mar. 22, 1955 |
| 2,706,752 | Dupy | Apr. 29, 1955 |
| 2,736,776 | Camras | Feb. 28, 1956 |
| 2,786,897 | Schwarz | Mar. 26, 1957 |
| 2,830,130 | Greenwood | Apr. 8, 1958 |
| 2,885,488 | Andrews | May 5, 1959 |
| 2,961,645 | Dickinson | Nov. 22, 1960 |